INVENTOR.
GILBERT W. KING
BY
Campbell, Brumbaugh, Free & Graves
HIS ATTORNEYS.

INVENTOR.
GILBERT W. KING
BY
Campbell, Brumbaugh, Free & Graves
HIS ATTORNEYS.

June 9, 1953 G. W. KING 2,641,522

DIGITAL READER

Filed Jan. 14, 1950 4 Sheets-Sheet 3

INVENTOR.
GILBERT W. KING
BY
Campbell, Brumbaugh, Free & Graves
HIS ATTORNEYS.

June 9, 1953 G. W. KING 2,641,522

DIGITAL READER

Filed Jan. 14, 1950 4 Sheets-Sheet 4

INVENTOR.
GILBERT W. KING
BY
Campbell, Brumbaugh, Free & Graves
HIS ATTORNEYS.

UNITED STATES PATENT OFFICE 2,641,522

DIGITAL READER

Gilbert W. King, South Lincoln, Mass., assignor to Arthur D. Little, Inc., Cambridge, Mass., a corporation of Massachusetts Application January 14, 1950, Serial No. 138,652

17 Claims. (Cl. 346—33)

The present invention relates to devices for indicating or recording instantaneous values of a variable. More particularly, it has to do with new and improved apparatus for converting instantaneous values of a variable to digital numbers which may be recorded in any suitable manner as in the form of perforations on cards, for example.

In the present practice, experimental data are usually recorded either by hand or by automatic recording devices such as the pen-galvanometer, for example. Generally the manual method is employed only when the data to be recorded are few in number and the time between successive readings is long enough to permit observation by the human eye and recording by hand. Where a large sample is desired for statistical treatment, or where the readings are required to be taken at a rate faster than the human eye and hand can respond, the automatic recording method is used. In certain cases, however, as where the readings are discontinuous or subject to large fluctuations, automatic recording apparatus of the type available heretofore cannot be used since it does not respond quickly enough to give the desired accuracy at high speeds of operation. Further, if a large number of sets of graphical data are recorded in the form of curves, for example, and have to be calibrated or corrected, and compared with each other, for example, treatment of the data becomes cumbersome and time consuming, even when the data are recorded automatically by a pen-galvanometer, for example, since this involves manually "reading off" points from the recorded curve or curves, applying some calculation to the readings and sometimes replotting the corrected readings.

It is an object of the invention, accordingly, to provide new and improved apparatus for converting instantaneous values, or average values taken over relatively short time intervals, of a variable to values representing digital numbers.

A further object of the invention is to provide new and improved apparatus for converting the value of a continuous physical variable such as a voltage, averaged over a time interval of adjustable length, into a digital number.

Another object of the invention is to provide new and improved variable to digital conversion apparatus of the above character which is simple in construction and which embodies a minimum number of components.

Yet another object of the invention is to provide new and improved digital conversion apparatus of the above character which is adapted to convert instantaneous values of a variable quantity, averaged over a given time interval, to binary digital numbers.

A still further object of the invention is to provide new and improved digital conversion apparatus of the above character which is adapted to convert instantaneous or average values of a variable to a digital number without loss of accuracy, namely, by using a unit in the binary system of representation whose value is equal to or slightly less than the noise level inherently and universally present in the variable being measured, said choice being in accordance with the best practice described by the present day theory of communication.

A further object of the invention is to provide new and improved digital conversion apparatus of the above character in which digital numbers representing instantaneous or average values of a variable may be indicated visually or recorded.

These and other objects of the invention are attained by impressing a voltage representing an instantaneous or average value of a variable, successively, on a plurality of relay devices which are biased at values corresponding to successive binary digits, respectively. A sufficient number of relay devices are employed to reproduce, to the required degree of accuracy, the highest digital number that is to be recorded.

With each relay device is associated electrical switching means which functions automatically to transfer the input signal applied to a preceding relay device to the next succeeding relay device. If the input signal supplied to a preceding relay device is less than the voltage required to render the latter device operative, the switching means transfers the input signal to the next succeeding relay device unchanged. If, however, the input signal to a preceding relay device is sufficiently large to render that device operative, the switching means operates automatically to supply to the next succeeding relay device the difference between the signal input to the preceding relay device and the bias applied thereto.

Each relay device rendered operative as described above may cause a corresponding visual indicator to be operated or a suitable record to be made such as a perforation in a card, for example.

Where the signal to be converted is changing at a relatively rapid rate, means is provided for sampling the instantaneous values of the signal at the beginning of each conversion cycle, the sample values thus obtained being converted to digital numbers as described above.

With the construction described above, instantaneous values of a variable may be readily converted to digital binary numbers. Further, the novel switching means embodied in the apparatus functions to prevent operation of a relay device unless it should actually be operated, thus avoiding inadvertent errors.

The invention may be better understood from the following detailed description of several representative embodiments thereof, taken in conjunction with the accompanying drawings in which.

Figures 1, 2:
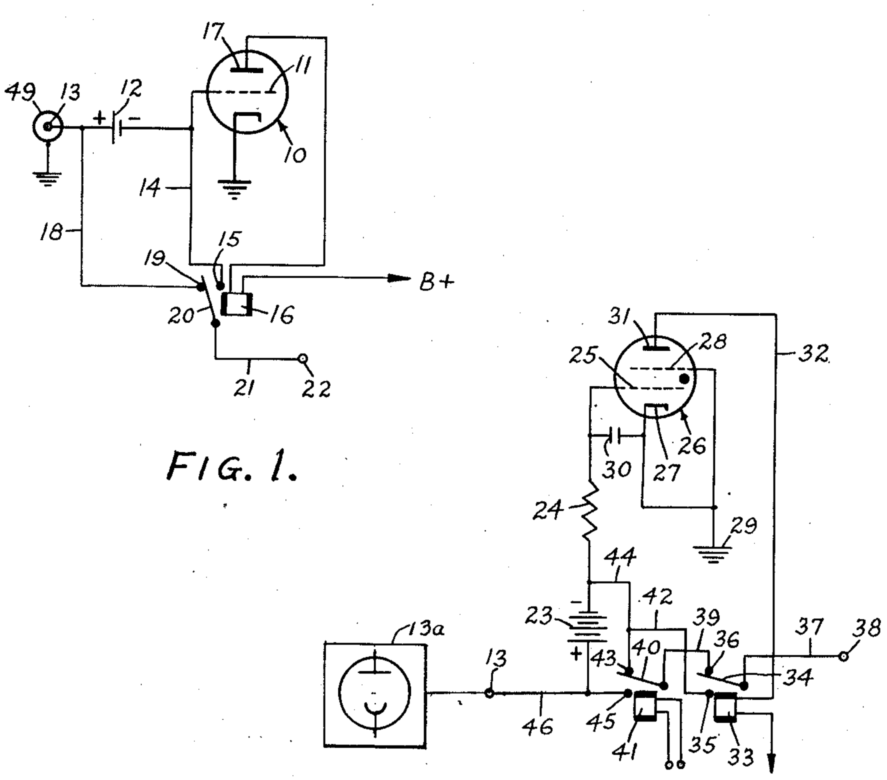
Fig. 1 is a schematic diagram of a basic component of digital conversion apparatus constructed according to the invention.
Fig. 2 illustrates schematically a preferred form of basic component according to the invention.

In the several typical forms of the invention to be described below, it is assumed that the variable to be recorded can be represented by a voltage of corresponding magnitude. As a practical matter, almost all physical variables of which experimental measurements are desired can be so represented. A typical example is the measurement of light intensity by a photomultiplier tube which, on exposure to the light, develops a corresponding voltage across a load resistor.

According to the invention, the voltage representing the variable is compared successively with each one of a plurality of voltages corresponding in magnitude with successive digital positions in a binary number system, respectively. The largest of the latter voltages, and the one against which the voltage corresponding to the variable to be measured is compared first, has a magnitude representing the highest power of two that could occur, i. e., the upper limit of the voltage to be recorded. The magnitudes of the succeeding voltages against which the voltage representing the variable is compared represent successively lower powers of two, there being as many as may be required to measure the voltage to be recorded to the desired degree of accuracy.

If at any comparison stage the voltage representing the variable to be measured happens to be larger than the comparison voltage, only the difference between the two voltages is passed on for comparison with the voltage representing the next lower power of two. At the same time, means may be initiated for producing an indication or a record. On the other hand, if the voltage representing the variable is smaller than the comparison voltage, the former voltage is passed on unchanged for comparison with the voltage representing the next lower power of two.

The voltages used for comparison and for subtraction from the input signal, when required, can be obtained from any convenient reliable source. In the circuits described here batteries are used as an example. Storage batteries when well charged, or dry cells are generally satisfactory. It is well known that the so-called "Standard Cell," such as a calomel cell, supplies a comparison voltage of a high degree of stability and of a value known to several significant figures. These cells are preferred means of measuring voltages in physical and physical-chemical experiments.

Thus, in recording measurements of a precise physical or physical-chemical experiment, very accurately known, accepted, and preferred standard voltages are available for the fundamental comparison and subtraction circuits of this invention. Those circuits then constitute preferred apparatus for reading voltages. However, it is possible to incorporate an electronic source of comparison and subtraction voltage when the use of batteries or standard cells is inconvenient.

A typical circuit element having the mode of operation described above is shown in Fig. 1. It comprises an electron tube 10, having a grid 11 connected to the negative terminal of a source of biasing voltage 12, the positive terminal of which is connected to an input lead 13. The lead 13 may be provided with a shield 49 which is grounded as shown. The grid 11 is also connected by a conductor 14 to one contact 15 of a relay 16, the winding of which is interposed between a suitable source of plate supply B+ and the plate 17 of the tube 10.

The input lead 13 is also connected by a conductor 18 to another contact 19 on the relay 16. Normally, the contact 19 is engaged by a contact arm 20 which is connected by a conductor 21 to an output terminal 22. Upon energization of the relay 16, the contact arm 20 disengages the contact 19 and engages the contact 15.

In operation, let it be assumed that the bias voltage provided by the source 12 corresponds to the value of a selected power of two. If, now, the voltage at the input lead 13 representing the variable to be measured is positive and is larger than the bias voltage, the tube 10 will become conducting, energizing the relay 16 and causing the movable contact arm 20 to disengage the contact 19 and to engage the contact 15. The output passed on to the next stage at the terminal 22 is, therefore, the difference between the voltage to be measured and the bias voltage. If, however, the input voltage at the input lead 13 is less than the bias voltage, the tube 10 remains nonconducting and the movable contact arm 20 remains in engagement with the contact 19. The output to the next stage, in this case, is the input at the lead 13, without change.

Because of uncertainties in the performance of the average relay, such as "chattering" and wide differences in the opening and closing times of supposedly identical relays, for example, it is desirable to use two relays to switch either the input to a stage or the input to the control grid of the tube in that stage to the next succeeding stage, as is shown in Fig. 2.

In Fig. 2, the signal input which may be received from a photocell device 13a, for example, at the input terminal 13 is supplied through a source of negative biasing voltage 23 and a resistor 24 to the control grid 25 of a conventional four electrode gas discharge device 26. The cathode 27 and the screen grid 28 of the device 26 may be connected to ground at 29 and a condenser 30 is preferably connected between the grid 25 and the cathode 27 in order to prevent possible firing of the tube 26 from spurious signal pickup.

The plate 31 of the gas discharge device 26 is connected by a conductor 32 in series with the winding of a relay 33 having a movable contact 34 adapted to engage selectively either of two fixed contacts 35 and 36. The movable contact 34 is connected by a conductor 37 to an output terminal 38, while the fixed contact 36 is connected by a conductor 39 to the movable contact 40 of a relay 41 which, in an actual digital conversion system, may be energized by suitable timing mechanism, as will be described in greater detail below. The fixed contact 35 on the relay 33 is connected by a conductor 42 to a fixed contact 43 on the relay 41 which is also connected by a conductor 44 to the negative terminal of the source of bias voltage 23. A second contact 45 on the relay 41 is connected by a conductor 46 to the positive terminal of the source of biasing voltage 23 and to the input lead 13.

Normally, the gas discharge device 26 is maintained nonconducting by the negative bias impressed upon the control grid 25 by the source 23. The voltage input 13 which is to be measured, is impressed upon the control grid 25 in series with the source of bias voltage 23. If the bias voltage is greater than the voltage to be measured, the gas discharge device 26 remains nonconducting so that when the relay 41 is subsequently energized by the timing mechanism, the voltage to be measured is passed on to the next succeeding stage through a circuit which is traced from the input lead 13 through the conductor 46, the relay contact 45 engaging contact arm 40, the conductor 39, the relay contact 36 engaging the contact arm 34 and the conductor 37 to the output terminal 38.

If, however, the voltage to be measured is larger than the bias voltage, the gas discharge device 26 becomes conducting and the relay 33 is energized. This causes the contact arm 34 to disengage the contact 36 and to engage the contact 35. Under these conditions, the difference between the voltage to be measured and the bias voltage is passed on to the next stage through a circuit which is traced from the input lead 13 through the conductor 46, the source of bias voltage 23, the conductors 44 and 42, the fixed contact 35 engaging movable contact arm 34, and the conductor 37 to the output terminal 38. The subsequent energization of the relay 41 by the timing mechanism does not affect this circuit in any way.

A representative digital conversion system comprising a plurality of elements of the type shown in Fig. 2 is illustrated in Figs. 3, 4, 5 and 6. Since in some cases the voltage to be read may vary at an extremely rapid rate, it is desirable to provide sampling circuit means for measuring instantaneous values of the voltage to be measured at times just prior to the initiation of the successive conversion cycles. A typical sampling circuit 47 (Fig. 3) may comprise a conventional electron tube 140 having a control grid 141 connected to the input lead 13, and having a cathode 142 connected through a resistor 143 to ground at 48, the shield 49 for the input lead 13 also being grounded through a conductor 50.

The tube 140 is preferably connected as a cathode follower and its plate 51 is connected by a conductor 52 to the positive terminal of a suitable source of plate supply voltage (not shown). The output from the tube 140 is fed from its cathode 142 by a conductor 53 to a fixed contact 54 on a relay 56 which is adapted to be engaged by a movable contact arm 55.

Connected between the relay movable contact arm 55 and ground is a fixed condenser 57 which is adapted to be charged by the output of the cathode 142 of the cathode follower 140 to a value proportional to the voltage to be measured, when the relay 56 is energized to bring its movable contact 55 into engagement with the contact 54. The voltage thus impressed on the condenser 57 is fed through a conductor 58 to the control grid 59 of a second electron tube 60, which may be mounted in the same envelope as the tube 140, if desired, and which is also preferably connected as a cathode follower. Thus, the plate 61 of the tube 60 is connected by the conductors 62 and 52 to the positive terminal of the source of plate supply voltage, and the cathode 63 is connected through a cathode resistor 64 to ground. At the end of each conversion cycle, the condenser 57 is adapted to be discharged to ground through a circuit including a resistor 65, a conductor 66, the contacts 81*f* and 82*f* of the timing relay 72*f*, and a conductor 154 as will be described later in greater detail.

The sampling relay 56 is adapted to be energized once at the beginning of each conversion cycle through a circuit which is traced from the positive terminal of the plate voltage supply through the conductors 52 and 78, a movable contact arm 77 on a Microswitch 144 which normally engages a fixed contact 115, a conductor 118, a fixed contact 127 engaged by a movable contact arm 129 on a relay 120, a conductor 130, the relay 56 and a resistor 145 to ground.

The Microswitch 144 is adapted to be actuated upon energization of the punching relay 76 (Figs. 3 and 6) at the end of a conversion cycle, and the circuit traced out above is completed when the Microswitch contact arm 77 subsequently returns to its normal position in engagement with the contact 115. Upon energization of the relay 56, the movable contact arm 55 engages the contact 54, permitting the sampling condenser 57 to charge up to the voltage output at the cathode 142 of the tube 140.

At the instant that the Microswitch movable contact arm 77 returns to its normal position in engagement with the contact 115, electrical energy is also impressed upon a parallel circuit having, in one branch, the series connected relays 119 and 120 and a condenser 122 in another branch. Thus, one end of the parallel circuit is connected to the conductor 118 and the other is connected through a resistor 121 to ground. While the relay 120 is deenergized, the sampling relay 56 remains energized through the circuit traced above. Energization of the relay 120 deenergizes the relay 56 and disconnects the sampling condenser 57 from the cathode 142 of the tube 140. Energization of the relay 119 causes its movable contact 125 to engage a fixed contact 123, thereby connecting the positive terminal of the plate supply voltage through the conductors 52, 124 to a conductor 74, thereby initiating operation of timing mechanism to be described later.

The purpose of the condenser 122 is to delay energization of the relays 119 and 120 until the sampling condenser has had time to charge to the voltage at the cathode 142 of the tube 140. After the condenser 57 is fully charged, it is disconnected from the cathode 142 by operation of the relays 120 and 56, and its voltage remains sensibly constant throughout the conversion cycle.

Figure 4:
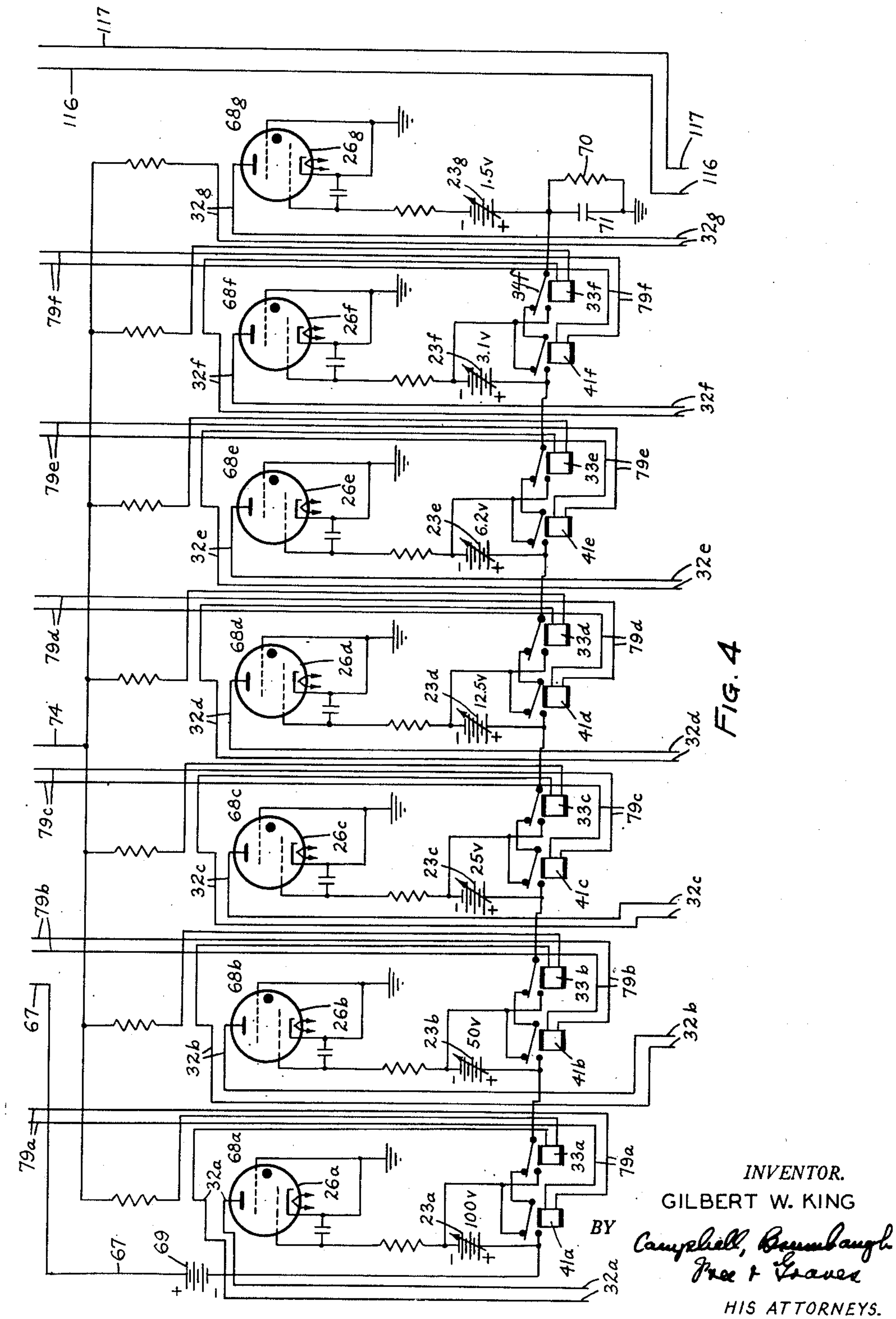
Fig. 4 shows schematically a plurality of relay devices in a typical digital conversion system, together with the switching means therefor.

The output of the cathode follower tube 60 is continuously applied through a conductor 67 to the first of a plurality of digital conversion stages 68*a*, 68*b*, 68*c*, 68*d*, 68*e*, 68*f* and 68*g* (Fig. 4). In order to counteract the steady current from the cathode follower tube 60, it is desirable to include a suitable source of voltage 69 in series with the conductor 67, as shown. In any specific digital conversion system, the number of counter stages employed will depend upon the degree of accuracy desired. In Fig. 4, a system employing only seven stages is shown, for example, as required to give an accuracy of reading of 1%.

Except for the last stage 68*g*, the several counter stages are identical with the single stage shown in Fig. 2, and corresponding parts in the former have been designated by corresponding reference characters with appropriate letters. The last stage 68*g* differs from Fig. 2 in that relays corresponding to the relays 41 and 43 have been eliminated because they are not needed. Further, the movable contact 34*f* of the relay 33*f* is connected to ground through a resistor 70, which is by-passed by a conductor 71. This prevents any rise in grid potentials while the movable contact arms on the relays are between contacts and results in improved stability.

Figure 6:
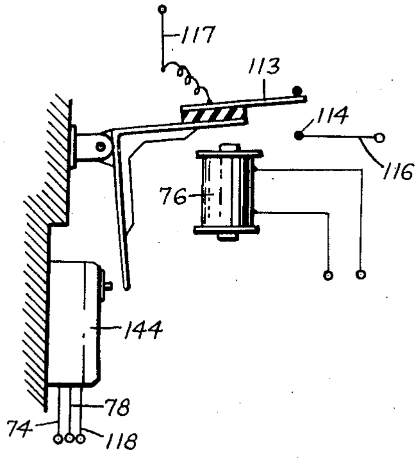
Fig. 6 is a schematic diagram of a typical combined relay and Microswitch that may be employed in the digital conversion apparatus.
Figure 3:
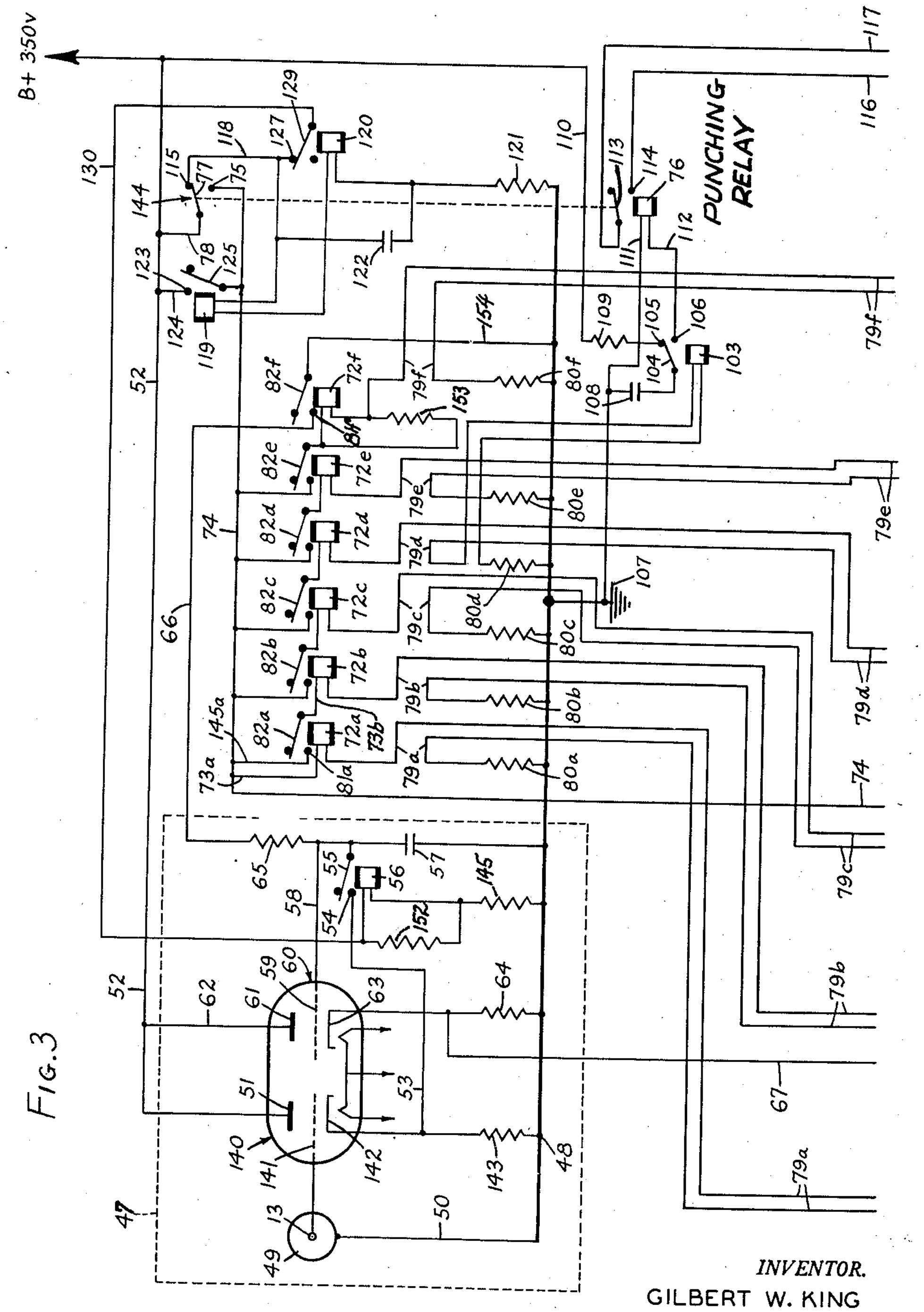
Fig. 3 is a schematic diagram showing a typical sampling means and timing mechanism for digital conversion apparatus constructed according to the invention.

The relays 41*a*, 41*b*, 41*c*, 41*d*, 41*e* and 41*f* are adapted to be energized successively by suitable timing mechanism which may comprise, for example, a plurality of timing relays 72*a*, 72*b*, 72*c*, 72*d*, 72*e* and 72*f* (Fig. 3). One terminal of the relay 72*a* is connected by the conductors 73*a* and 74 to the fixed contact 75 on the Microswitch 144, which is adapted to be engaged by the movable contact 77, the latter being connected through the conductors 78 and 52 to the positive terminal of the source of plate supply voltage. As best shown in Fig. 6, the Microswitch 144 is adapted to be actuated by the punching relay 76 when the latter is energized. The relay 72*a* is also connected by a conductor 79*a* through the winding of the relay 41*a* (Fig. 4) and a resistor 80*a* to ground (Fig. 3).

The relay 72*a* has a fixed contact 81*a* connected by a conductor 145*a* to the conductor 74. The contact 81*a* is adapted to be engaged by a movable contact 82*a*, which is connected by a conductor 73*b* to one terminal of the next succeeding relay 72*b*. The other terminal of the relay 72*b* is connected in series with the relay 41*b* (Fig. 4) and a resistor 80*b* to ground (Fig. 3). In similar fashion, each of the remaining relays 72*c*, 72*d*, 72*e* and 72*f* are adapted to be connected to the positive terminal of the source of plate supply through contacts on the preceding relay, and are connected to ground through the corresponding relays 41*c*, 41*d*, 41*e* and 41*f* in the several counter stages (Fig. 4), and the resistors 80*c*, 80*d*, 80*e* and 80*f* in the timing mechanism (Fig. 3).

Figure 5:
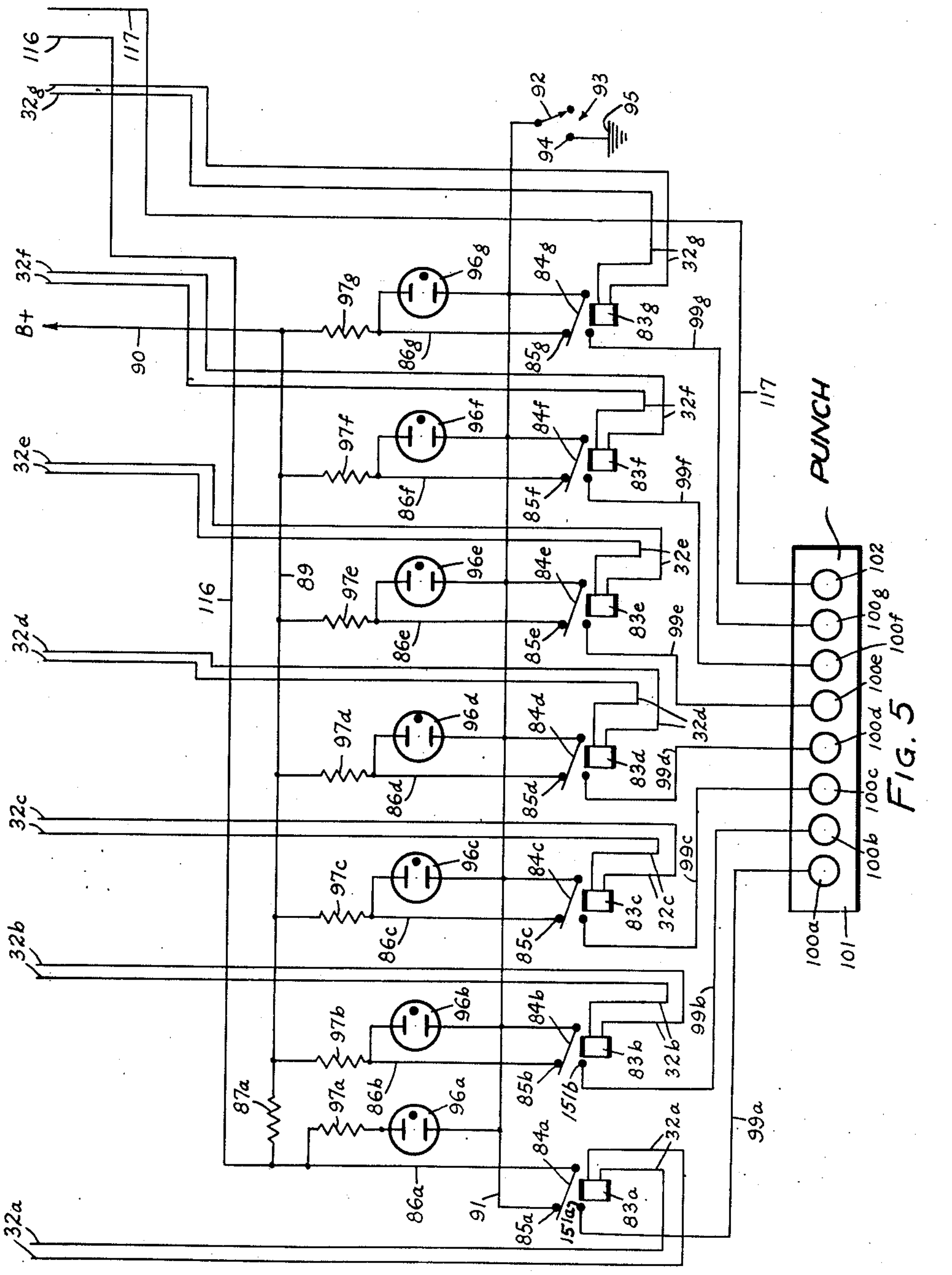
Fig. 5 illustrates schematically representative indicating and recording means for a digital conversion system.

Connected in the plate circuits of the respective gas discharge devices 26*a*, 26*b*, 26*c*, 26*d*, 26*e*, 26*f* and 26*g* (Fig. 4) are a plurality of relays 83*a*, 83*b*, 83*c*, 83*d*, 83*e*, 83*f* and 83*g*, respectively (Fig. 5). The relays 83*b*, 83*c*, 83*d*, 83*e*, 83*f* and 83*g* are identical in construction and it will be necessary to describe only one in detail, corresponding parts in the others being designated by corresponding reference characters with appropriate letters. Relay 83*b* has a movable contact arm 84*b* which normally engages a fixed contact 85*b*, and which is adapted to engage a second contact 151*b*. The movable contact arm 84*b* is connected to a conductor 91 and the contact 151*b* is connected by a conductor 99*b* to a terminal 100*b* on a suitable recording device 101 which may be a conventional IBM card perforating punch, for example, such as shown in the United States patent to Palmer et al., No. 2,536,955, dated January 2, 1951.

Associated with the relay 83*b* is an indicating circuit comprising, for example, a neon tube 96*b* and a series resistor 97*b*. This indicating circuit is adapted to be energized by a circuit which is traced from the positive terminal of the source of plate supply through the conductors 90 and 89, the resistor 97*b*, the tube 96*b*, the conductor 91, a movable contact 92 of a switch 93, adapted to engage a fixed contact 94, and ground 95. The relay contact 85*b* is connected to the junction between the resistor 97*b* and the tube 96*b*. Since the movable contact arm 84*b* normally engages the contact 85*b*, the neon light 96*b* is short-circuited so that it is not lighted. When the relay 83*b* is energized, however, the movable contact arm 84*b* disengages the contact 85*b*, breaking the shunt circuit so that if the contact arm 92 of the switch 93 is moved into engagement with the fixed contact 94 the neon lamp 96*b* will be lighted.

The relay 83*a* serves as a control to indicate that the voltage to be read has gone "off scale," i. e. has risen above a predetermined value determined by the source 23*a*. To this end, the conductor 91 is connected to the fixed relay contact 85*a* which is normally engaged by the contact arm 84*a*, and the latter is connected through the conductors 86*a* and 115, the normally open contacts 113 and 114 on the relay 76 (Fig. 3) and a conductor 117 to the contact 102 on the punch 101 (Fig. 5).

It will be understood, therefore, that if the relay 83*a* is not energized during a conversion cycle, but one or more of the relays 83*b*, 83*c*, 83*d*, 83*e*, 83*f* and 83*g* are energized, the closing of the contacts 113 and 114 upon energization of the relay 76 will complete connections between the punch terminal 102 and any of the terminals 100*b*, 100*c*, 100*d*, 100*e*, 100*f* and 100*g* for which a corresponding relay 83*b*, 83*c*, 83*d*, 83*e*, 83*f* and 83*g* has been energized, thereby operating the punch 101 and causing it to punch holes corresponding to the binary number to be recorded, in a card. If the relay 83*a* has been energized, however, the opening of the contacts 84*a* and 85*a* makes it impossible for the punch terminal 102 to be connected to any of the terminals 100*b*, 100*c*, 100*d*, 100*e*, 100*f* and 100*g*, and the punch 101, therefore, is rendered inoperative. If desired, the contact 151*a* may be connected by a conductor 99*a* to a punch terminal 100*a* which will cause the punch 101 to record an "X," for example, when the relay 76 is energized.

An indicating circuit comprising a resistor 97*a* and a neon tube 96*a* may be connected across the conductors 91 and 86*a*, and the latter conductor may be connected to the conductor 89 by a resistor 87*a* which prevents interference with the punch circuits when the relay 83*a* is not energized. Normally, the tube 96*a* is short-circuited by the engaged contacts 84*a* and 85*a* of the relay 83*a*. Energization of the latter opens its contacts, causing the tube 96*a* to be lighted and indicating that the voltage to be read has gone "off scale."

Operation of the punch 101 (Fig. 5) at the conclusion of each conversion cycle may be effected by means of a relay 103 (Fig. 3) connected in series with the timing relay 72*d*. The relay 103 has a movable contact arm 104, normally engaging a fixed contact 105, which is adapted to be moved into engagement with a fixed contact 106. Connected between the movable contact arm 104 and ground 107 is a condenser 108. When the movable contact arm 104 is in engagement with the contact 105, as shown in Fig. 3, the condenser 108 is adapted to be charged through a resistor 109 and a conductor 110 connected to the positive terminal of the source of plate supply.

Upon energization of the relay 103, the movable contact arm 104 disengages the contact 105 and engages the contact 106, thereby impressing the voltage across the condenser 108 on the relay 76 through the conductors 111 and 112. The relay 76 is not fully energized until a predetermined time has elapsed as determined by the value of the condenser 108 and the amount of inductance in the relay 76, if any. Preferably, the system is designed so that full energization of the relay 76 takes place shortly after the timing relay 72*f* has been energized. Further, the condenser 108 is of such a size that the time constant of the circuit including it and the coils of the relay 76 keeps the latter closed long enough to actuate the punch 101.

Energization of the relay 76 also actuates the Microswitch 144 (Figs. 3 and 6) causing its contact arm to become disengaged from the contact 115 and to engage the contact 75, as stated above.

*Operation*

Initially, the biasing voltages provided by the sources 23*a*, 23*b*, 23*c*, 23*d*, 23*e*, 23*f* and 23*g* are selected to be proportional to successive powers of two, that provided by the last source 23*g* being approximately equal to the noise level in the system and that provided by the source 23*a* being proportional to the largest power of two needed to convert the maximum expected value of the voltage to be measured to a digital number. Thus, in a typical circuit, the bias voltages supplied by the sources 23*a*, 23*b*, 23*c*, 23*d*, 23*e*, 23*f* and 23*g* might be 100, 50, 25, 12.5, 6.2, 3.1 and 1.5 volts, respectively.

In operation, the voltage to be read, namely, the input at the conductor 13 (Fig. 3) which is a function of the intensity of light falling on the photocell 13*a*, is continuously applied to the grid 141 of the tube 140, so that the voltage at the cathode 142 varies in a corresponding manner. Assuming that the filaments of the tubes are warmed up and that plate supply voltage is being fed to the system, the relay 56 is energized through a circuit which is traced from the positive terminal of the source of plate supply voltage through the conductors 52 and 78, the movable contact arm 77 on the Microswitch 144 engaging the fixed contact 115, the conductor 118, the fixed contact 127 engaged by the movable contact arm 129 on the relay 120, the conductor 130, the relay 56 and the resistor 145 to ground, thus energizing the relay 56. This causes the movable contact arm 55 to engage the contact 54, thereby connecting the condenser 57 to the cathode 142 of the cathode follower 140. This is the sampling operation and it produces a voltage across the condenser 57 which is proportional to the instantaneous value of the voltage input supplied to the tube 140 from the input lead 13.

The voltage across the condenser 57 is impressed upon the control grid 59 of the cathode follower tube 60, the output at the cathode 63 of which is continuously fed through the conductor 67 and the source of compensating voltage 69 to the first counter stage 68*a* (Fig. 4).

If the voltage input to the first stage 68*a* is larger than the bias voltage provided by the source 23*a*, the device 26*a* becomes conducting, thus energizing the relays 33*a* (Fig. 4) and 83*a* (Fig. 5). As stated above, upon energization of the relay 83*a*, the circuits for operating the punch 101 are broken so that the latter is rendered inoperable to perform a punching operation, regardless of which of the relays 83*b*, 83*c*, 83*d*, 83*e*, 83*f* and 83*g* may subsequently be energized in the conversion cycle.

A given time determined by the condenser 122, say 20 milliseconds after energization of the relay 56, the relays 119 and 120 (Fig. 3) are energized. Energization of the latter relay disengages the contacts 127 and 129, thereby deenergizing the relay 56 so that the sampling operation is discontinued. The voltage then existing on the condenser 57 remains sensibly constant during the conversion cycle.

Energization of the relay 119 closes its contacts 125 and 123. This connects the conductor 74 to the positive terminal of the source of plate supply voltage through the conductors 124 and 52, thereby energizing both the first timing relay 72*a* and the relay 41*a* which is associated with the gas discharge device 26*a* (Fig. 4), and simultaneously applies plate voltage to the gas discharge devices 26*a*, 26*b*, 26*c*, 26*d*, 26*e*, 26*f* and 26*g*.

If the voltage input to the first stage 68*a* of the counter is less than the biasing voltage provided by the source 23*a*, neither of the relays 33*a* nor 83*a* will have been energized. Consequently, upon energization of the relay 41*a*, the input to the first stage 68*a* will be passed over without change to the input of the second stage 68*b*.

If the voltage input to the second stage 68*b* is greater than the bias voltage provided by the source 23*b*, the gas discharge device 26*b* will become conducting, thereby energizing the relays 33*b* and 83*b* (Fig. 5). Energization of the latter relay prepares a circuit to the terminal 100*b* of the punch 101 so that when the circuit to the terminal 102 is completed upon operation of the punching relay 76, a hole corresponding to the position of the terminal 100*b* will be punched in a card. Since the relay 33*b* is energized, subsequent energization of the relay 41*b* by timing relay 72*a* passes on to the input of the third stage the difference between the input to the second stage and the bias voltage provided by the source 23*b*.

If, on the other hand, the input to the second stage is less than the bias voltage provided by the source 23*b*, neither of the relays 33*b* and 83*b* will be energized so that no hole corresponding to the position of the terminal 100*b* will be punched by the punch 101. Further, upon energization of the relay 41*b* by the timing relay 72*a*, the input to the second stage will be passed on to the input of the third stage without change.

The input to the first stage 68*a* is thus passed on successively to the inputs of subsequent stages either unchanged or less the value of the bias voltage provided by any source that is less than the magnitude of the input to that stage. Whenever one of the gas discharge devices 26*a*, 26*b*, 26*c*, 26*d*, 26*e*, 26*f* or 26*g* has been rendered conducting, a circuit will have been prepared to the corresponding terminal 100*b*, 100*c*, 100*d*, 100*e*, 100*f* or 100*g* on the punch 101 so that corresponding holes will be punched in a card by the latter when the punching operation is initiated.

Energization of the timing relay 72*c* during the timing sequence results in energization of both the timing relay 72*d* and the relay 103. Operation of the relay 103 impresses the voltage developed across the condenser 108 on the relay 76. As indicated, the condenser 108 introduces a time delay which prevents the relay 76 from being fully energized until after the final timing relay 72*f* has been actuated. Upon energization of the relay 72*f*, its contacts 81*f* and 82*f* are engaged, thereby connecting conductor 66 to ground and discharging the sampling condenser 57 through the resistor 65.

Shortly thereafter, the relay 76 becomes fully energized, and its movable contact arm 113 engages the contact 114. This connects the terminal 102 of the punch 101 (Fig. 5) to those terminals 100b, 100c, 100d, 100e, 100f and 100g for which relays 83b, 83c, 83d, 83e, 83f and 83g have been energized during the conversion cycle so that a punching operation is effected and holes corresponding to the binary number to be recorded are punched in a card.

Operation of the punching relay 76 actuates the Microswitch 144 (Fig. 3), moving its contact arm 77 out of engagement with the contact 115. This breaks the connection between the conductor 118 and the positive terminal of the source of plate supply so that the relays 119 and 120 are deenergized. Deenergization of the relay 119 disconnects the conductor 74 from the conductor 52. However, electrical energy continues to be supplied temporarily to the timing relays (Fig. 3) and to the plates of the gas discharge devices in the several conversion stages (Fig. 4) through the Microswitch movable contact arm 77 which is now in engagement with the contact 75. Deenergization of the relay 120 prepares a circuit to the sampling relay 56 which is completed when the Microswitch 144 returns to its initial position at the end of the conversion cycle.

After the condenser 108 has been discharged sufficiently, the relay 76 is deenergized, causing its contacts 113 and 114 to become disengaged. Simultaneously, the Microswitch 144 is released so that its contact arm 77 is moved out of engagement with the contact 75 and into engagement with the contact 115. The breaking of the contacts 75 and 77 removes the plate supply voltage from both the timing relays (Fig. 3) and the gas discharge devices in the several counter stages (Fig. 4). Hence the latter become nonconducting and any energized relays 33a, 33b, 33c, 33d, 33e, 33f and 33g and 83a, 83b, 83c, 83d, 83e, 83f and 83g are restored to the normal deenergized condition. The closing of the contacts 77 and 115 again energizes the sampling relay 56, thus initiating a new sampling operation, whereupon the conversion cycle is repeated essentially in the manner described above.

The resistor 152 in shunt with the relay 56 introduces a time lag which is sufficient to insure complete deenergization of the last timing relay 72f before the relay 76 is energized, so as to avoid possible loading of the cathode follower 60 by the resistor 65.

If desired, a resistor 153 may be connected in shunt with the last timing relay 72f (Fig. 3) to allow sufficient time for the contacts on the relay 41f to close and for the gas discharge device 68g to fire if it is to be fired, before the relay contacts 81f and 82f (Fig. 3) close and discharge the sampling condenser 57.

Actually, the relays 83g, 83f, 83e, 83d, 83c, 83b and 83a correspond to successive powers of two, the relays 83g and 83a representing the zero and sixth powers, respectively. If, for example, the voltage input to the first counter stage 68a (Fig. 4) is such that the relays 83b and 83d should be actuated at the end of a conversion cycle, the first gas discharge device 26a will not fire, but the entire input voltage will be passed on to the second stage 68b. Here, the voltage input will be greater than the bias voltage supplied by the source 23b, so that the gas discharge device 26b will fire. Accordingly, the voltage input to the third stage 68c will be the original input less 50 volts, the bias provided by the source 23b. The input to the third stage 68c will not be sufficient to fire the gas discharge device 26c but will be passed on unchanged to the fourth stage 68d. The fourth stage input will be greater than the bias provided by the source 23d so that the gas discharge device 26d will fire. Hence, the input passed on to the fifth stage will be the fourth stage input less 12.5 volts, the bias provided by the source 23d. In the present case, the difference voltage (if any) will not be sufficient to fire any of the gas discharge devices 26e, 26f and 26g.

The actual binary number set up in the punch 101 can be observed visually by closing the switch 93. This will light lamps 96a, 96b, 96c, 96d, 96e, 96f or 96g corresponding to such of the relays 83a, 83b, 83c, 83d, 83e, 83f and 83g as may be energized at the end of a conversion cycle. Thus, for the case given above, the lamps 96b and 96d, corresponding to the digital numbers 32 and 8, respectively, would be lighted.

In the foregoing description, the system is operated "self-cycling," namely, the time at which reading and punching occurs is controlled by the system itself. The system is preferably designed so that the "self-cycling" operation occurs at a frequency determined by the fastest time the punch 101 can punch and skip. For a standard punch of conventional type, a self-cycling speed of one punch every 89 milliseconds is satisfactory and is easily attainable with the present system. However, if more rapid apparatus is available for punching or otherwise recording binary numbers, the self-cycling speed of the digital conversion system can be sensibly increased.

Instead of operating the conversion system "self-cycling" as described above, the apparatus may be cycled at any desired rate by any suitable control mechanism. This might be accomplished, for example, by short circuiting the leads to the relay 103 and connecting the leads 116 and 117 (Fig. 3) to an intermittently operated switch (not shown). It will be understood that each time the switch is closed, a punching operation will occur and the reader will reset itself for the next punching operation essentially in the manner described above.

As stated, the digital conversion system of the invention can be used to record values of any variable that can be represented by a correspondingly varying electric signal. For example, curves present in the technical literature can be read by a conventional photomultiplier tube or the like, the output voltage of which can be fed to the input lead 13 (Fig. 3) of the digital conversion system. Also, the output of the system may be read or recorded by other devices than the card punch 101 (Fig. 5) which is shown by way of example.

From the foregoing, it will be apparent that the invention provides a novel and highly effective system for converting values of a variable quantity to digital binary numbers in which form they can be recorded directly as perforations in punch cards, for example. By virtue of the novel construciton described above, large quantities of data may be recorded at high speed and in very convenient form for subsequent treatment such as calibration, the application of corrections and other statistical operations, for example. The apparatus is further capable of recording effectively discontinuous values of a variable quantity.

It will be understood that the specific embodiments described above and illustrated in the drawings are susceptible of numerous modifications in form and detail within the scope of the invention. For example, hard tubes in "flip-flop" circuits or the like might be used in place of the gas discharge devices 26a, etc. Transistors might also be employed for this purpose. Other modifications will be readily apparent to persons skilled in the art. The particular embodiments disclosed herein, therefore, are not to be regarded as imposing any limitations whatsoever upon the scope of the following claims.

I claim:

1. In an electrical circuit having input terminals and output terminals, the combination of a first channel adapted to be interposed between said input and output terminals, a second channel adapted to be interposed between said input and output terminals and including a source of electrical energy, and electrical means responsive to a function of the signal input to said input terminals and of the voltage of said source, for selectively controlling the interposition of said first and second channels between said input and output terminals.

2. In an electrical circuit having input terminals and output terminals, the combination of circuit means connected to one of said input terminals and having a source of voltage connected in series therewith, switching means for selectively connecting one of said output terminals to said one input terminal or to said circuit means, and relay means responsive to a function of both the input to said input terminals and the voltage of said source for controlling the operation of said switching means.

3. In an electrical circuit having input terminals and output terminals, the combination of circuit means connected to one of said input terminals and having a source of voltage connected in series therewith, switching means for selectively connecting one of said output terminals to said one input terminal or to said circuit means, an electron tube having a grid connected to said circuit means and having plate and cathode electrodes, and relay means connected in the plate-cathode circuit of said tube for controlling the operation of said switching means.

4. In an electrical circuit having input and output terminals, the combination of an electron tube having plate, grid and cathode electrodes, circuit means including a source of bias voltage interposed between one of said input terminals and the grid of said tube, switching means normally connecting one of said output terminals to said one input terminal and adapted to connect said one output terminal to the terminal of said bias voltage nearest said grid, and relay means interposed in the plate-cathode circuit of said tube for actuating said switching means to disconnect said one output terminal from said one input terminal and to connect said one output terminal to said bias voltage terminal.

5. In an electric circuit having input and output terminals, the combination of circuit means connected to one of said input terminals, first switching means having a pair of fixed contacts connected to said circuit means and to said one input terminal, respectively, and having a movable contact adapted to engage either of said fixed contacts selectively, second switching means having a pair of fixed contacts connected to the movable contact of said first switching means and to said circuit means, respectively, and having a movable contact connected to one of said output terminals and adapted to engage either of said fixed contacts, first relay means for actuating said first switching means and second relay means responsive to a function of the input to said input terminals for actuating said second switching means.

6. In an electrical circuit having input and output terminals, the combination of circuit means connected to one of said input terminals, first switching means having a first contact connected to said circuit means, a second contact connected to said one input terminal and a movable contact normally engaging said first contact but adapted to be moved into engagement with said second contact, second switching means having a first contact connected to the movable contact on said first switching means, a second contact connected to said circuit means, and a movable contact connected to one of said output terminals, said movable contact normally engaging the first contact of said second switching means but being adapted to be moved into engagement with the second contact thereof, first relay means for actuating said first switching means, and second relay means responsive to a function of the input to said input terminals for actuating said second switching means.

7. In an electrical circuit having input and output terminals, the combination of an electron tube having plate, grid and cathode electrodes, circuit means including a source of bias voltage interposed between one of said input terminals and a grid of said tube, first switching means having a first contact connected to the terminal of said bias voltage nearest said grid, a second contact connected to said one input terminal, and a movable contact normally engaging said first contact but being adapted to be moved into engagement with said second contact, second switching means having a first contact connected to the movable contact of said first switching means, a second contact connected to said bias voltage terminal, and a movable contact connected to one of said output terminals and normally engaging the first contact of said switching means but being adapted to be moved into engagement with the second contact thereof, first relay means for actuating said first switching means, and second relay means connected in the plate-cathode circuit of said tube for actuating said second switching means.

8. In apparatus for converting values of a variable to digital numbers, the combination of circuit means having an input terminal and including a source of voltage representing a digital number, an output terminal, first switching means responsive to a function of the input supplied to said input terminal and of the voltage supplied by said source for connecting said output terminal selectively to a third terminal or to said circuit means, second switching means for connecting said third terminal selectively to said input terminal or to said circuit means, and means rendered operative when said function has a predetermined value.

9. In apparatus for converting values of a variable to digital numbers, the combination of a plurality of stages each comprising circuit means having an input terminal and including a source of voltage representing a digital number, the voltages in successive stages being different and corresponding to different digital numbers, respectively, first switching means in each stage and responsive to a function of both the input to that stage and of the voltage provided by the source therein for connecting the input terminal of the circuit means in the next succeeding stage selectively to the circuit means of the preceding stage or to another terminal therein, second switching means in each stage for connecting said another terminal selectively to the circuit means of that stage or to the input terminal thereof, mechanism for actuating the second switching means in each of said stages in succession, and means for each of said stages rendered operative when said function of the input to each stage and of the voltage provided by the source therein has a predetermined value.

10. In apparatus for converting values of a variable to digital numbers, the combination of a plurality of stages each comprising a gas discharge device having plate, grid and cathode electrodes, and circuit means including a source of bias voltage connected at its opposite ends to an input terminal and to a grid of said device, respectively, the bias voltages in successive stages being different and corresponding to different digital numbers, first switching means in each stage for connecting the input terminal of the circuit means in the next succeeding stage selectively to the circuit means of the preceding stage or to another terminal therein, second switching means in each stage for connecting said another terminal in that stage selectively to the circuit means therein or to the input terminal thereof, first relay means in each stage and connected in the plate-cathode circuit of the gas discharge device therein for actuating the first switching means thereof, second relay means in each stage for actuating the second switching means thereof, timing mechanism for successively energizing the second relay means in each of said stages, and a plurality of relays connected in the plate-cathode circuits of said gas discharge devices, respectively.

11. In apparatus for converting values of a variable to digital numbers, the combination of a plurality of stages each comprising a gas discharge device having plate, grid and cathode electrodes, and circuit means including a source of bias voltage connected at its opposite ends to an input terminal and to a grid of said device, respectively, the bias voltages in successive stages being different and corresponding to different digital numbers, first switching means in each stage for connecting the input terminal of the circuit means in the next succeeding stage selectively to the circuit means of the preceding stage or to another terminal therein, second switching means in each stage for connecting said another terminal in that stage selectively to the circuit means therein or to the input terminal thereof, first relay means in each stage and connected in the plate-cathode circuit of the gas discharge device therein for actuating the first switching means thereof, second relay means in each stage for actuating the second switching means thereof, electrical means responsive to electrical values corresponding to values of a variable for impressing an electric signal representative of the instantaneous value of said variable upon the input terminal of the circuit means in the first of said stages, timing mechanism initiated in timed relation to the production of said signal for successively energizing the second relay means in each of said stages, and a plurality of circuit preparing relays connected in the plate-cathode circuits of said gas discharge devices, respectively.

12. In apparatus for converting values of a variable to digital numbers, the combination of a plurality of stages each comprising a gas discharge device having plate, grid and cathode electrodes, and circuit means including a source of bias voltage connected at its opposite ends to an input terminal and to a grid of said device, respectively, the bias voltages in successive stages differing by a factor of two and corresponding to different binary digital numbers, first switching means in each stage for connecting the input terminal of the circuit means in the next succeeding stage selectively to the circuit means of the preceding stage or to another terminal therein, second switching means in each stage for connecting said another terminal in that stage selectively to the circuit means therein or to the input terminal thereof, first relay means in each stage and connected in the plate-cathode circuit of the gas discharge device therein for actuating the first switching means thereof, second relay means in each stage for actuating the second switching means thereof, electrical sampling means responsive to electrical values corresponding to values of a variable for delivering a signal representative of the instantaneous value of said variable periodically to the input terminal of the circuit means in the first of said stages, timing mechanism initiated in timed relation to the delivery of said signals for successively energizing the second relay means in each of said stages, and a plurality of circuit preparing relays connected in the plate-cathode circuits of said gas discharge devices.

13. In digital conversion apparatus as defined in claim 12, the combination of a plurality of switching means adapted to be actuated by said circuit preparing relays, respectively, a binary code card perforating punch for recording the output of said plurality of switching means, said punch having a plurality of circuits connected to said last-named switching means, respectively, and adapted to be prepared by operation thereof, and relay means rendered operative by said timing mechanism for enabling such of said last-named circuits as have been prepared and for operating said punch.

14. In digital conversion apparatus as defined in claim 10, the combination of a plurality of indicating means, and a plurality of switching means adapted to be actuated by the relays in the plate-cathode circuits of said gas discharge devices, respectively, for operating said respective indicating means.

15. In digital conversion apparatus as defined in claim 12, the combination of a plurality of switching means adapted to be actuated by said circuit preparing relays, respectively, a card perforating punch having a plurality of circuits connected to said last-named switching means, respectively, and adapted to be prepared by operation thereof, relay means rendered temporarily operative by said timing mechanism for completing such of said last-named circuits as have been prepared and for operating said punch, means operated by said timing mechanism for erasing the signal value delivered to the input terminal of the circuit means in the first of said stages, and means rendered operative when said last-named relay means again becomes inoperative for delivering a new signal value to the input terminal of the circuit means in the first of said stages.

16. In digital conversion apparatus as defined in claim 10, the combination of electrical sampling means including a condenser adapted to be charged periodically to electrical values corresponding to values of a variable for delivering signals respectively representative of instantaneous values of said variable periodically to the input terminal of the circuit means in the first of said stages, a plurality of switching means adapted to be actuated by the relays in the plate-cathode circuits of said gas discharge devices, respectively, a card perforating punch having a plurality of circuits connected to said last-named switching means, respectively, and adapted to be prepared by operation thereof, relay means rendered temporarily operative by said timing mechanism for completing such of said last-named circuits as have been prepared and for operating said punch, means operated by said timing mechanism for discharging said condenser to erase the signal value delivered to the input terminal of the circuit means in the first of said stages, and means rendered operative when said last-named relay means again becomes inoperative for charging said condenser to an electrical value corresponding to a new value of said variable, thereby delivering a new signal to the input terminal of the circuit means in the first of said stages.

17. In digital conversion apparatus as defined in claim 12, the combination of a plurality of switching means adapted to be actuated by said circuit preparing relays, respectively, a binary code card perforating punch having a plurality of circuits connected to said last-named switching means, respectively, and adapted to be prepared by operation thereof, and means rendered operative periodically for completing such of said last-named circuits as have been prepared and for operating said punch.

GILBERT W. KING.

References Cited in the file of this patent

UNITED STATES PATENTS

| Number | Name | Date |
|---|---|---|
| 2,371,040 | Fisher et al. | Mar. 6, 1945 |
| 2,401,621 | Desch et al. | June 4, 1946 |
| 2,436,512 | Hollywood | Feb. 24, 1948 |
| 2,422,428 | Mumma | June 1, 1948 |
| 2,451,859 | Mumma et al. | Oct. 19, 1948 |
| 2,457,214 | Doll et al. | Dec. 28, 1948 |
| 2,466,467 | Mumma et al. | Apr. 5, 1949 |
| 2,495,075 | Mumma | Jan. 17, 1950 |
| 2,513,112 | Shepherd | June 27, 1950 |
| 2,536,955 | Palmer | Jan. 2, 1951 |